(12) United States Patent
Behnke et al.

(10) Patent No.: US 7,630,809 B2
(45) Date of Patent: Dec. 8, 2009

(54) METHOD FOR CONTROLLING A HARVESTING MACHINE

(75) Inventors: Willi Behnke, Steinhagen (DE);
Christoph Bussmann, Harsewinkel (DE); Joachim Baumgarten, Beelen (DE); Andreas Wilken, Bissendorf (DE); Werner Fitzner, Sassenberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 163 days.

(21) Appl. No.: 11/445,885

(22) Filed: Jun. 2, 2006

(65) Prior Publication Data
US 2006/0272307 A1 Dec. 7, 2006

(30) Foreign Application Priority Data
Jun. 6, 2005 (DE) .................. 10 2005 026 159

(51) Int. Cl.
A01D 41/00 (2006.01)
A01D 41/127 (2006.01)
G06F 19/00 (2006.01)
G06F 7/00 (2006.01)

(52) U.S. Cl. ................ 701/50; 56/10.2 R
(58) Field of Classification Search ............ 701/1, 701/36, 50; 56/10.2 R, 10.2 C; 460/1, 4–7
See application file for complete search history.

(56) References Cited

U.S. PATENT DOCUMENTS

| | | | | |
|---|---|---|---|---|
| 3,442,068 A * | 5/1969 | Bulin | .............. | 460/6 |
| 3,563,013 A * | 2/1971 | Elfes | .............. | 460/5 |
| 3,952,829 A * | 4/1976 | Gray | .............. | 180/170 |
| 3,999,359 A * | 12/1976 | Jordan et al. | .............. | 56/27.5 |
| 4,112,479 A * | 9/1978 | White | .............. | 361/243 |
| 4,130,980 A * | 12/1978 | Fardal et al. | .............. | 56/10.2 F |
| 4,458,471 A * | 7/1984 | Herwig | .............. | 56/10.2 G |
| 4,466,230 A * | 8/1984 | Osselaere et al. | .............. | 460/5 |
| 4,487,002 A * | 12/1984 | Kruse et al. | .............. | 460/6 |
| 4,513,562 A * | 4/1985 | Strubbe | .............. | 56/10.2 G |
| 4,663,714 A * | 5/1987 | Cornell et al. | .............. | 701/52 |
| 4,727,710 A * | 3/1988 | Kuhn | .............. | 56/10.2 G |
| 4,934,985 A * | 6/1990 | Strubbe | .............. | 460/4 |
| 5,228,360 A * | 7/1993 | Johnson | .............. | 74/512 |
| 5,312,299 A * | 5/1994 | Behnke et al. | .............. | 460/5 |
| 5,394,678 A * | 3/1995 | Lonn et al. | .............. | 56/10.2 H |
| 5,569,081 A * | 10/1996 | Baumgarten et al. | .......... | 460/112 |
| 5,586,033 A * | 12/1996 | Hall | .............. | 701/50 |
| 6,146,268 A * | 11/2000 | Behnke et al. | .............. | 460/4 |
| 6,247,296 B1 * | 6/2001 | Becker et al. | .............. | 56/11.2 |
| 6,553,300 B2 * | 4/2003 | Ma et al. | .............. | 701/50 |
| 6,587,772 B2 * | 7/2003 | Behnke | .............. | 701/50 |

(Continued)

FOREIGN PATENT DOCUMENTS

DE 101 47 733 4/2003

(Continued)

*Primary Examiner*—Edward Pipala
(74) *Attorney, Agent, or Firm*—Michael J. Striker

(57) ABSTRACT

In a method for controlling a harvesting machine various units of the harvesting machine are adjusted and/or monitored in a plurality of separate control processes based on certain received control commands, using a process coordination unit, an operating mode of a first control process is determined with consideration for a current operating mode of a second control process, and corresponding control unit and a harvesting machine with a control unit of this type are provided.

16 Claims, 2 Drawing Sheets

U.S. PATENT DOCUMENTS

| | | | |
|---|---|---|---|
| 6,592,453 B2 * | 7/2003 | Coers et al. | 460/4 |
| 6,863,604 B2 * | 3/2005 | Behnke | 460/6 |
| 6,895,734 B2 * | 5/2005 | Ameye | 56/10.8 |
| 7,001,267 B2 * | 2/2006 | Behnke et al. | 460/6 |
| 2002/0083695 A1 * | 7/2002 | Behnke et al. | 56/119 |
| 2003/0014171 A1 * | 1/2003 | Ma et al. | 701/50 |
| 2003/0060245 A1 * | 3/2003 | Coers et al. | 460/2 |
| 2003/0066277 A1 * | 4/2003 | Behnke | 56/10.2 R |
| 2004/0060271 A1 * | 4/2004 | Ameye | 56/10.8 |
| 2004/0186597 A1 * | 9/2004 | Wippersteg et al. | 700/31 |
| 2004/0259610 A1 * | 12/2004 | Behnke et al. | 460/59 |
| 2005/0137003 A1 * | 6/2005 | Behnke et al. | 460/1 |
| 2005/0143153 A1 * | 6/2005 | Behnke et al. | 460/4 |
| 2005/0241285 A1 * | 11/2005 | Maertens et al. | 56/1 |
| 2006/0086295 A1 * | 4/2006 | Jensen | 111/118 |
| 2006/0090444 A1 * | 5/2006 | Ameye | 56/51 |
| 2006/0123757 A1 * | 6/2006 | Baumgarten et al. | 56/10.2 R |
| 2006/0271243 A1 * | 11/2006 | Behnke et al. | 700/284 |

FOREIGN PATENT DOCUMENTS

| | | |
|---|---|---|
| DE | 102 53 081 | 5/2004 |
| EP | 1 277 388 | 1/2003 |

* cited by examiner

METHOD FOR CONTROLLING A HARVESTING MACHINE

CROSS-REFERENCE TO A RELATED APPLICATION

The invention described and claimed hereinbelow is also described in German Patent Application DE 10 2005 026 159.0 filed on Jun. 6, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for controlling a harvesting machine, in particular a self-propelled harvesting machine such as a combine harvester, a forage harvester, etc., with which various units of the harvesting machine are adjusted and/or monitored in a plurality of separate, defined control processes based on certain received control commands.

The present invention further relates to a corresponding control unit with which a control method of this type can be carried out, and a harvesting machine with a control unit of this type.

Agricultural harvesting machines include one or more adjustable working units for processing various crop materials. With modern harvesting machines, the individual units are equipped with adjusting devices—which are usually remotely controllable from the driver's cab—with which various control parameters of the working units can be set. Typical working units of a combine harvester are, e.g., the threshing mechanism, which usually includes a concave and one or more cylinders, and a cleaning unit located downstream of the threshing mechanism, the cleaning unit typically including a blower and a plurality of sieves. In addition, every self-propelled harvesting machine includes a related working unit that drives the harvesting machine. Different types of crops and harvesting conditions, such as moisture, crop height, ground conditions, etc., require that the individual units and/or their adjustable control parameters be adjusted as exactly as possible to the specific, on-going harvesting process, in order to obtain an optimum overall operating result.

Despite the many setting aids offered to operators by the manufacturers of harvesting machines—such as comprehensive operator training, printed lists of setting values predetermined for various harvesting situations that the operator can refer to, and electronic tools such as electronic fieldwork information systems preprogrammed with optimized combinations of setting values for highly diverse harvesting situations for the operator to choose from—it is still relatively difficult for operators to adjust the machine such that it functions in an optimum manner in accordance with the desired requirements. This is the case, in particular, for inexperienced and/or untrained operators, particularly at the beginning of a harvesting season. In many cases, therefore, the harvesting machine and/or its working units are not adapted to the current harvesting process in an optimum manner. As a result, the available harvesting capacity of the machine is under-utilized, poor operating results are obtained, or, in some cases, unnecessary crop losses result.

To solve this problem, a growing number of processes for adjusting—and optimizing, in particular—and/or monitoring the harvesting machine and/or its units are being automated. For example, DE 101 47 733 A1 describes an automated method for optimizing the threshing mechanism and cleaning unit of an agricultural harvesting machine. With this method, only one control parameter of the harvesting machine is varied, while the setting and harvesting conditions remain the same. Subsequently, by comparing the working results, precisely that setting value is selected for the particular control parameter that yielded a better working result. The operating-result values can be recorded, in particular, and, by referring to the recorded operating results, a relationship between the varied setting parameter and the operating result obtained can be identified, based on which an optimum setting parameter can be selected. Using this method, even inexperienced operators learn relatively quickly whether, when and to what extent the varied control parameter affects the operating result, and they can set the control parameter accordingly. The setting can also be carried out automatically, of course.

Furthermore, a control unit is described in DE 102 53 081 A1 with which the ground speed of a harvesting machine can be automatically set and monitored.

One of the problems associated with the automation of processes of this type is that certain control processes can collide with each other. To optimize the threshing mechanism setting or the cleaning unit, for example, the ground speed must be regulated such that the throughput is constant. Activating a ground speed regulation that regulates with respect to a constant ground speed or loss would not be suitable in this case. In addition, it would be counterproductive if optimization of the threshing mechanism and the cleaning unit would take place simultaneously, since, when the threshing mechanism is adjusted, the input parameters for the cleaning unit are changed, and optimization of the cleaning unit requires at least short-term variations in the threshing mechanism setting.

The greater the number of individual subprocesses that are automated on the harvesting machine, the more difficult it is for the operator to determine which processes are allowed to run simultaneously and, if so, in which operating modes.

Publication EP 1 277 388 A1 describes a control system with a learning fuzzy interference system with fuzzy logic that is capable of learning working conditions and recalling them. This control system is designed to prevent the situation in which interactions between various harvesting subsystems, i.e., between various automated subprocesses, for controlling various units of the harvesting machine are not taken into consideration, which would result in erroneous adjustments. The control system described in that publication is extremely complicated in design and requires a considerable amount of computing capacity and computing speed, neither of which is available in harvesting machines at this time.

SUMMARY OF THE INVENTION

An object of the present invention, therefore, is to provide a method and a control unit for controlling a harvesting machine, with which a collision of various control processes running on the harvesting machine are prevented in a simple, cost-effective manner.

In keeping with these objects and with others which will become apparent hereinafter, one feature of the present invention resides, briefly stated, in a method for controlling a harvesting machine, comprising the steps of acting on various units of the harvesting machine selected from the group consisting of adjusting the various units, monitoring the various units, and both, in a plurality of separate control processes based on certain received control commands; and using a process coordination unit to determine an operating mode of a first control process with consideration for a current operating mode of a second control process.

According to the present invention, with the method described initially, various units of the harvesting machine are adjusted and/or monitored in a plurality of separate control processes based on certain received control commands that can be entered by an operator, for example. Using a process coordination unit, an operating mode of a first control process is determined with consideration for a current operating mode of a second control process.

In terms of the present invention, the term "operating mode" of a process is understood to mean, e.g., whether or not the process is even active and, if it is, in what manner the process is taking place. An "operating mode change" in terms of the present invention therefore exists, e.g., when the type of parameter with respect to which regulation is carried out is changed and, therefore, the mode of operation of the entire process is also changed, or the process is activated or deactivated. In contrast, an operating mode change does not exist when only one parameter value is changed in order to take adjustment parameters of other units or processes into account, for example.

One example of this is a ground speed regulating process, which can be regulated in an operating mode, e.g., with respect to a constant setpoint speed, i.e., with respect to a first parameter, and which, in a second operating mode, can be regulated with respect to a constant crop material throughput, i.e., with respect to a second parameter. An example of changing the operating mode is, e.g., switching from the stated first operating mode to the stated second operating mode, i.e., the second parameter (constant setpoint throughput) is taken into consideration instead of the first parameter (constant setpoint speed). Another example of changing the operating mode is a complete deactivation of the ground speed regulation. In contrast, simply changing the setpoint speed or setpoint throughput should not be considered to mean the operating mode has been changed, although the method according to the present invention does not exclude the possibility of also adjusting the parameter values in a process with consideration for other control processes.

A collision between various control processes can be prevented in a very simple manner using the control method according to the present invention.

A control unit according to the present invention requires, in addition to an interface for receiving control commands—and, possibly, additional input control parameters—a control signal interface, e.g., in the form of a plurality of control signal outputs, in order to control various units of the harvesting machine and a number of process control units, which are designed such that they apply control signals—determined in accordance with the control processes—via the control signal interface to the various units based on detected control commands in separate, defined control processes in order to perform adjustments and/or monitoring. According to the present invention, this control unit also requires a process coordination unit connected with the process control units which is configured such that it determines an operating mode of a first control process with consideration for a current operating mode of a second control process and transmits related operating mode specification signals to the process control units.

A control unit of this type can be designed, e.g., in the form of a programmable microprocessor, the individual process control units, in particular, and the process coordination unit being implemented in the form of software on this processor. It is also possible to design—in accordance with the present invention—an existing programmable control unit of a harvesting machine by implementing units of this type realized in the form of software modules, provided this control unit includes an appropriate interface for detecting control commands and a control signal interface for controlling various units of the harvesting machine. The required software components and/or all required program code means can be loaded directly into the memory of the programmable control unit, e.g., using a data memory, as a computer program product, in the form of an update in particular.

The process coordination unit is superior to the individual process control units, preferably as a central module. It is also possible, however, for the process coordination unit to be realized as a subunit within a process control unit. Accordingly, the process control unit in which the process coordination unit is realized as a submodule would act on the other process control units as the "master process control unit". In this case as well, the process coordination unit ultimately determines the operating mode of its own process control unit and the operating mode of the "foreign" process control units.

The subclaims contain particularly advantageous embodiments and refinements of the present invention. The control unit can also be refined in accordance with the dependent claims of the method for controlling a harvesting machine, or vice versa.

The various control processes—some of which compete with each other—are preferably a cleaning optimization process, a threshing mechanism optimization process and/or a ground speed of a constant setpoint speed. In a further operating mode, a throughput regulating operating mode, the speed can be regulated with respect to a constant crop material throughput. In a third operating mode, a loss-regulation operating mode, the speed can be regulated with respect to a constant quantity of "lost" crop material.

Preferably, a certain control command, e.g., of the ground speed regulating process, used to set a certain operating mode of a first control process is initially transmitted to the process coordination unit. Based on the control command and with consideration for the operating mode, the process coordination unit then determines the operating mode of the first control process based, e.g., on related status information about a second control process, e.g., the cleaning or threshing mechanism optimization process. To this end, the interface for detecting the control commands is preferably connected with the process coordination unit such that control commands detected by the interface are initially transmitted to the process coordination unit.

To obtain the required status information about the current operating mode of a control process, the process coordination unit preferably has a suitable process status input.

Preferably, when the operating mode of a second control process is changed, a first control process is automatically switched to another operating mode by the process coordination unit.

In a preferred variation, when the cleaning optimization process or threshing mechanism optimization process is switched on, the ground speed regulating process, for example, is switched to the throughput regulating operating mode if the ground speed regulating process was previously active in another operating mode, e.g., in the Tempomat operating mode or the loss-regulation operating mode.

In a particularly preferred exemplary embodiment, a parameter value recorded in a first control process or a second control process is transmitted to the process coordination unit, which releases this parameter value for use, as needed, in the second control process or the first control process. This means that a parameter value from the first control process is used in the second control process, or vice versa. As a result, the situation can be prevented in which findings obtained in a control process do not have to be newly reacquired in another control process, which would waste time. For example, process variables such as mean layer thickness are determined, e.g., as part of the ground speed regulating process when it is regulated with respect to a constant throughput. These parameter values can be used advantageously, e.g., as part of the cleaning optimization process.

The process coordinator can preferably accept these parameter values, and decide when and for how long a parameter value of this type is valid. As soon as a control process that could use these parameter values is activated, the parameter values can be made available to the particular control process. Using the process coordination unit, it is therefore possible to control the individual control processes such that they are coordinated with each other in an optimum manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
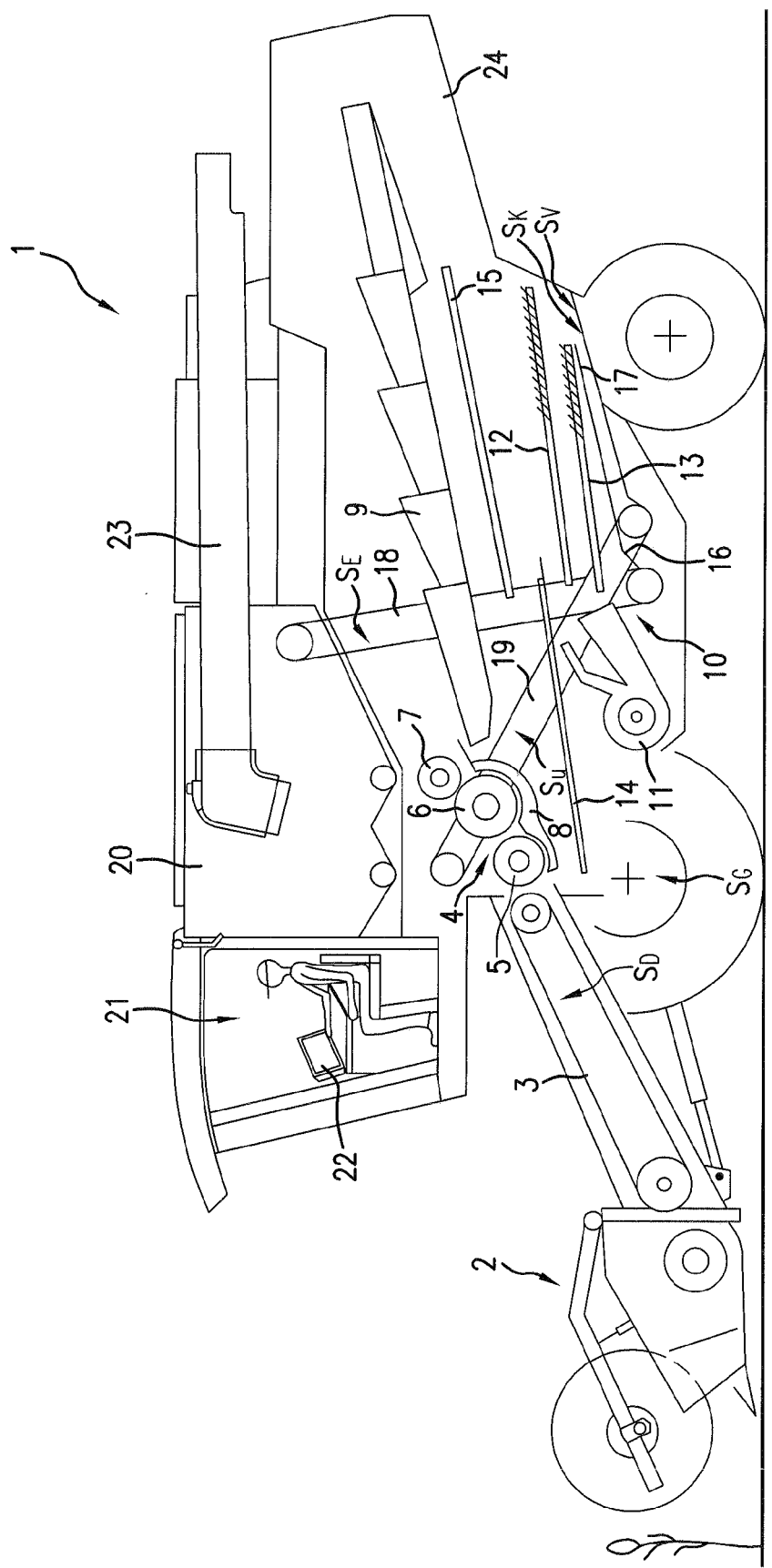
FIG. 1 shows a schematic cross section through a combine harvester.

The exemplary embodiment of the present invention shown in FIG. 1 is a self-propelled combine harvester 1 with a tangential or cross-flow threshing mechanism 4 and a shaker 9 located behind it, as the separating unit. The separating unit is a tray-type shaker 9 with a plurality of shaking speeds. A cleaning unit 10 is located beneath shaker 9, cleaning unit 10 being composed of a plurality of sieves 13 located one on top of the other, and a blower 11.

The mode of operation of a combine harvester 1 of this type is as follows:

Using a reel of the cutting disc, the crop material is placed on mowing unit 2 and is cut using knives. The crop material is then conveyed via a header auger and a feed rake in a feeder housing 3 to the inlet of threshing mechanism 4. A throughput measuring unit (throughput sensor) $S_D$ that measures the layer thickness and, therefore, the crop material throughput, is located in feeder housing 3.

A feed and/or pre-acceleration cylinder 5 is located at the inlet of threshing mechanism 4. Located behind threshing mechanism 4, in the direction of crop flow, is a cylinder 6 with an axis of rotation positioned transversely to the direction of crop flow, i.e., transversely to the longitudinal axis of the combine harvester. Located beneath cylinder 6 is a concave 8 which is shaped to encompass cylinder 6. The crop material coming out of feeder housing 3 is grasped by pre-acceleration drum 5 and pulled further by cylinder 6 through the threshing gap between cylinder 6 and concave 8. The crop material is threshed, i.e., beaten and/or crushed, by the beater bars of cylinder 6, a grain-chaff mixture falling downward through concave 8 and being subsequently guided via a capture and guide floor 14 to cleaning unit 10 in order to separate the grains from the admixtures, i.e., stalk and chaff parts.

From threshing mechanism 4, the threshed crop flow is directed by impeller 7 to tray-type shaker 9, via which the grain and any short straw and chaff located in the crop flow is separated out. Via a further capture and guide floor 15, the grain, short straw and chaff also reach cleaning unit 10, where the grain is separated from the short straw and chaff.

The grain is separated from the non-grain components in cleaning unit 10 in a manner such that wind is blown through the sieve openings (holes, mesh, slits) into sieves 12, 13 using blower 11, the wind loosening the crop material directed over sieves 12, 13 and ensuring that the specifically lighter chaff and short-straw portions are separated out, while the heavy crop grains fall through the sieve openings. An upper sieve 12 and a lower sieve 13 are located one on top of the other in certain areas such that the crop material is sifted with different levels of fineness at the various levels.

The grain that passes through both sieves 12, 13 of cleaning unit 10 falls to a first capture and guide floor 16 and is conveyed to a grain-delivery auger. The grain is then conveyed by an elevator 18 into a grain tank 20 of combine harvester 1, from where it can be transferred to a trailer as necessary using a tank unloading conveyor 23. The yield amount can be measured with the aid of a yield amount measuring unit 18 (yield amount sensor) $S_E$ located in elevator 18 or at the output of elevator 18 and, there, measures the total quantity conveyed, e.g., based on the weight conveyed by elevator 18 or based on optical and/or capacitive measurements, etc.

The particles in cleaning unit 10 that initially fall, at the rear end, through the sieve openings of upper sieve 12 are typically heavier particles, i.e., particles that contain a grain particle that has not been fully separated from other components of the grain. These particles fall, behind lower sieve 13, onto a second capture and guide floor 17 located beneath and somewhat behind the first capture and guide floor 16, and are returned to threshing mechanism 4 as tailings via a tailings elevator 19.

Components that do not fall through upper sieve 12 are discarded as a loss. The straw and a certain percentage of waste grain also travel via tray-type shaker 9 to the rear end 24 of combine harvester 1, from where they are ejected.

A cleaning-loss measuring unit (loss sensor) $S_V$, which is typically designed as a knock sensor, is located directly beneath the rear end of upper sieve 12 and is used to measure the losses due to cleaning. The signal detected by this loss sensor $S_V$ is a measure of how many components fall directly behind upper sieve 12. Based on this information, the total loss can be estimated relatively well.

The total tailings are measured with the aid of a total tailings-measuring unit (total tailings sensor) $S_U$ located in tailings elevator 19, where it measures the total quantity conveyed, e.g., also via the weight conveyed by tailings elevator 19 or via optical and/or capacitive measurements, etc.

The grain portion of the total tailings, i.e., the grain tailings, is measured using a grain-tailings measuring unit (grain tailings sensor) $S_K$ located on the second capture and guide floor 16 behind lower sieve 13. Grain-tailings measuring unit 17 is also preferably a knock sensor, the output signal of which is a measure of the amount of grain that falls behind lower sieve 13 into the tailings.

The current ground speed of combine harvester 1 can be determined using a ground speed measuring unit $S_G$.

All of these measuring units $S_D$, $S_E$, $S_V$, $S_U$, $S_K$, $S_G$ are connected to a control unit 25. A control terminal 22 is also connected to control unit 25, it being possible for a driver to use control terminal 22 to operate and/or program control unit 25. Control terminal 22 is located inside driver's cab 21.

The connection of individual measuring units $S_D$, $S_E$, $S_V$, $S_U$, $S_K$, $S_G$ and control terminal 40 with control unit 25, and control unit 25 itself, are not shown in FIG. 1, to prevent the figure from becoming overly complex. Instead, a somewhat more detained depiction is shown in FIG. 2, to which reference is made for the explanations to follow.

Figure 2:
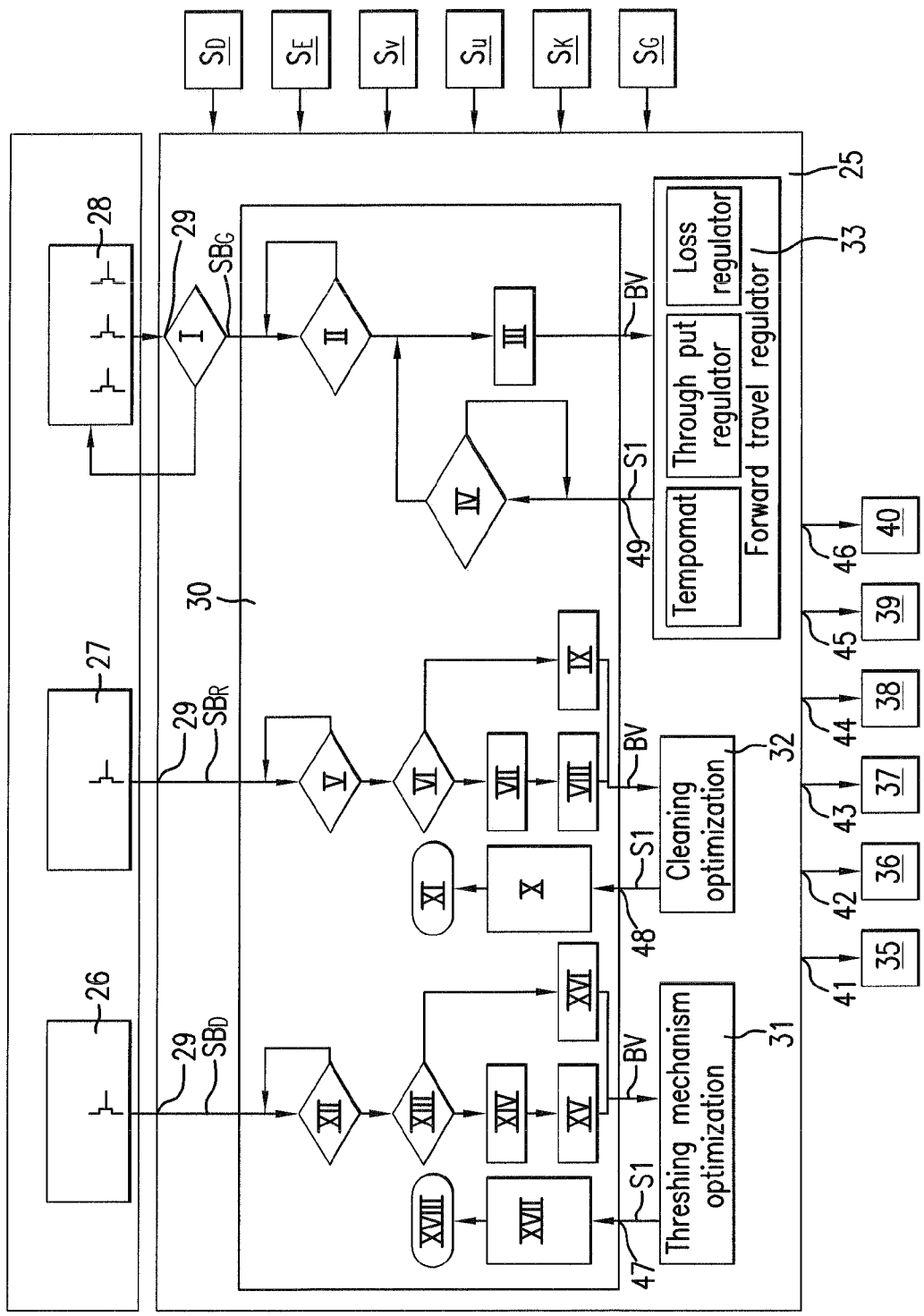
FIG. 2 is a schematic depiction of an exemplary embodiment of a control unit according to the present invention.

As shown in FIG. 2, control terminal 22 includes three control switches 26, 27, 28. The first switch serves to adjust the threshing mechanism optimization process. The second switch serves to adjust the cleaning optimization process. Third switch 28 is a selection switch 28 used to switch the ground speed regulating process, i.e., the "forward-travel regulator". With the aid of these switches 26, 27, 28, the operator can enter control commands $SB_D$, $SB_R$, $SB_G$ to switch the relevant control processes to certain operating modes. Control commands $SB_D$, $SB_R$, $SB_G$ are then transmitted to control unit 25 via interfaces 29.

It is clear that control terminal 22 can have a different configuration than highly-simplified control terminal 22 with three different switches 26, 27, 28 shown in the figure. For example, the control terminal can be much more extensive, with a greater number of switches or other operating elements for setting other components, and on which highly diverse information is displayed for the operator. It is also possible, in particular, for all switches and other operating elements to be realized in the form of a touchpad.

Instead of individual sub-interfaces 29 for detecting control commands $SB_D$, $SB_R$, $SB_G$ from individual switches 26, 27, 28, it is also possible to have only one common data interface between control terminal 22 and control unit 25, via which all data, control commands, etc., are transmitted.

As shown in FIG. 2, the control unit also includes six different control signal outputs 41, 42, 43, 44, 45, 46, with which various units of harvesting machine 1 are controlled. The first two control inputs 41, 42 are connected with cylinder drive 35 and threshing gap adjusting device 36 of threshing unit 4. Downstream control signal outputs 43, 44, 45 are connected with blower drive 37, upper sieve adjustment 38 and lower sieve adjustment 39 of cleaning unit 10. A further control signal output 46 is connected with drive unit 40 of harvesting machine 1. It is used to regulate the ground speed. Relevant control signals are transmitted via control signal outputs 41, 42, 43, 44, 45, 46 as setpoint values to particular components 35, 36, 37, 38, 39, 40. Using not-shown sensors, control unit 25 can check to determine whether the desired setting values were actually attained.

In this case, control unit 25 itself is designed in the form of a programmable microprocessor on which the individual components shown—e.g., in this case, a process coordination unit 30, a process control unit 31 for implementing the threshing mechanism optimization process, a process control unit 32 for realizing the cleaning optimization process and a process control unit 33 for implementing the ground speed regulating process—are realized in the form of modules.

For the rest, only those components of control unit 25 are shown in FIG. 2 that are required below to describe the present invention. It is clear that a control unit 25 of this type can also control other (not shown) working units, e.g., a layer-height setting, and that the control unit can be located—also together with control units for other working units—in the form of modules in a master control unit of combine harvester 1. In addition, a control unit 25 of this type can also include further measured-value inputs and control-parameter outputs. In particular, combine harvester 1 can include additional sensor devices in the grain tank and/or at the outlet of the grain elevator, e.g., grain breakage detectors, with which damaged and/or broken grains can be detected, the measured values of which are transmitted to the control unit.

As mentioned above, a threshing mechanism optimization process control unit 31 is realized in control unit 25 depicted in FIG. 2. The threshing mechanism optimization process has only two operating modes, i.e., "active" and "inactive". This means this process can be activated or deactivated, e.g., by an operating mode specification signal BV transmitted by process coordinator 30 to threshing mechanism optimization process control unit 31. With the present exemplary embodiment, however, only the threshing mechanism optimization process is activated by the operating mode specification signal BV and the process deactivates automatically when it ends, i.e., when the optimum threshing mechanism settings have been found. In this case, a corresponding status signal SI is returned to a status signal input 47 of process coordination unit 30.

A cleaning optimization process control unit 32 is configured similarly. It is also activated by an operating mode specification signal BV and therefore switched into the "active" operating mode. If the optimum cleaning unit values have been found, the cleaning optimization process is terminated and is automatically deactivated. A corresponding status signal SI is subsequently returned to a status signal input 48 of process coordination unit 30.

Third process control unit 33 is forward-travel regulator 33. In this case there are three active operating modes in addition to the "active" operating mode. They are depicted as individual blocks. Process coordination unit 30 uses an operating mode specification signal to switch on the appropriate mode and/or to deactivate forward-travel regulator 33. One of the operating modes is the "Tempomat". In this operating mode, regulation is carried out with respect to a fixed setpoint ground speed. The second operating mode is a throughput regulating process, with which the speed is regulated such that throughput is constant. This can be monitored, e.g., using throughput sensor $S_D$. The third operating mode is a loss regulating process, with which the speed is regulated such that the crop material losses are constant. This can be monitored, e.g., using loss sensor $S_V$.

In this case as well, a status signal SI that contains information about the current operating mode of the forward-travel regulator is returned to a status information input 49 of process coordination unit 30.

The possible sequences that can take place in control unit 25 and/or in process coordination unit 30 are described below. Based on input control commands $SB_D$, $SB_R$, $SB_G$, individual process control units 31, 32, 33 are controlled, with the aid of operating mode specification signals BV, such that no collisions occur between the various control processes.

With regard for the ground speed regulating process, control command $SB_G$ triggered with the aid of selection switch 28 for forward-travel regulator 33—since this selection switch can be used to select three different operating modes to activate the forward-travel regulator—is initially forwarded, in a first process step I in control unit 25, to an interrogation loop, which carries out a permanently query as to whether control command $SB_G$ was changed. If it was, this control command $SB_G$ is transmitted to process coordination unit 30. There, a further interrogation loop is carried out to initially clarify, in process step II, whether the threshing mechanism optimization process or the cleaning optimization process is active. If so, a waiting period ensues until the process has ended. This means, the operating mode of forward-travel regulator 33 is temporarily blocked against a change in this case.

Only if neither the threshing mechanism optimization process nor the cleaning optimization process is active will the operating mode of forward-travel regulator 33 be specified in process step III based on control command $SB_G$, and a related operating mode specification signal BV will be transmitted to forward-travel regulator 33. Status information is transmitted continually from forward-travel regulator 33 to process coordination unit 30 via status signal input 49, so that process coordination unit 30 is informed about the current operating mode.

It is also possible, of course, for a type of logbook to be kept in process coordination unit 30, in which operating mode specification signals BV are stored so that, based on the operating mode specification signals output by process coordination unit 30, the current operating mode of the particular process control units 31, 32, 33 is obvious. The advantage of transmitting status information SI, however, is that when, e.g., process control units 31, 32, 33 are controlled directly and process coordination unit 30 is bypassed, e.g., when emergency deactivation is carried out, process coordination unit 30 is notified of this.

Based on status information SI from threshing mechanism optimization process control unit 31 and cleaning optimization process control unit 32, an initial check is carried out in process step IV to determine whether the operating mode of the threshing mechanism optimization process or the cleaning optimization process was changed. This query is carried out permanently in the form of a loop. If it is determined that the threshing mechanism and/or cleaning optimization was changed, the operating mode of forward-travel regulator 33 is reset in step III based on certain rules. For example, when the threshing mechanism optimization process or the cleaning optimization process is activated, forward-travel regulator 33 is automatically set to the "throughput regulation" operating mode. If the particular optimization process has ended, this change in operating mode of the threshing mechanism optimization process or the cleaning optimization process is automatically detected. Forward-travel regulator 33 is then reset to the previous operating mode.

Control command $S_B$ coming from switch 27 for preselection of the cleaning optimization process is initially blocked in process coordination unit 30, if necessary. First, clarification is carried out in process step V to determine whether the current threshing mechanism optimization process is active. The cleaning optimization process can be activated only if the current threshing mechanism optimization process is not active. In this case, a check is first carried out in process step VI to determine whether forward-travel regulator 33 is active. If it is, the current operating mode of forward-travel regulator 33 is checked, in process step VII, and, in step VIII, forward-travel regulator 33 is switched to the "throughput regulation" operating mode, provided it is not already running in this operating mode. However, if it is determined in process step VI that forward-travel regulator 33 is in the "not active" operating mode, a display is shown to the driver on a control terminal, in step IX, that indicates a ground speed range within which the driver must remain manually to carry out the cleaning optimization process. Whether and how this specification takes place ultimately depends on the specific type of cleaning optimization process, however. The cleaning optimization process is then activated via the output of an operating mode specification signal to process control unit 32.

For example, a special cleaning optimization process of this type could proceed as follows: While the throughput remains as consistent as possible, individual units of the cleaning unit, e.g., the upper sieve adjustment, lower sieve adjustment or blower speed can be varied in a wide range, then the dependencies of the losses, grain tailings and total tailings on the individual parameters are determined. Based on these measured values, mathematical functions can be subsequently determined and, using these mathematical functions, optimum values for the individual setting parameters can be searched for.

When the cleaning optimization process has ended, this is transmitted as status information SI to a status signal input 48 of process coordination unit 30. In method step X, it is then ensured, for example, that, if forward-travel regulator 33 was switched over in process step VIII, then forward-travel regulator 33 is now returned to the previous operating mode. As an alternative, the displays activated in method step IX can be deactivated again, with which the driver is notified of the speed he must maintain in order to optimize cleaning. The cleaning optimization process is completely ended in method step XI.

The coordination of the threshing mechanism optimization process is carried out in a similar manner. If control unit 25 receives a corresponding control command $SB_D$ from preselection switch 26 via interface 26', a check is first carried out in method step XII to determine whether the cleaning optimization process is active or not. The threshing mechanism optimization process can be activated only if the cleaning optimization process is not active. In this case, a check is first carried out in process step XIII to determine whether forward-travel regulator 33 is active. If it is, the exact operating mode of forward-travel regulator 33 is queried, in method step XIV, and forward-travel regulator 33 is switched to the "throughput regulation" operating mode in method step XV, provided this is necessary.

If forward-travel regulator 33 is not active, a related display is shown for the driver, in method step XVI, which indicates the speed range within the driver must remain during the threshing mechanism optimization process. Only then is an operating mode specification signal BV transmitted to process control unit 31 to activate the threshing mechanism optimization process. Likewise, when the threshing mechanism optimization process has ended, status information SI is returned by process control unit 31 via a status information input 31 to process coordination unit 30. In method step XVII, process coordination unit 30 then ensures that the previous forward-travel regulator mode is switched back on, or that the display that notifies the driver of the speed range within which he must remain is closed. The threshing mechanism optimization process is completely ended in method step XVIII.

Instead of separate status information inputs 47, 48, 49 for the individual process control units 31, 32, 33, the process coordination unit 30 can also include one central status information input, of course, via which all process control units 31, 32, 33 transmit their status signals SI. Likewise, process coordination unit 30 can have, instead of a plurality of control signal outputs 41, 42, 43, 44, 45, 46, only one common control signal output as the control signal interface, via which the various units of the harvesting machine are acted upon with control signals. This control signal interface can also be connected with the status signal input and/or the interface for detecting the control commands, or one common interface. A general interface of this type can be realized, e.g., with the aid of a bus system in the harvesting machine.

This relatively simple exemplary embodiment shows how it can be ensured—with with the aid of a process coordination unit 30 and without considerable technical outlay—that various control processes can be realized in separate process control units 31, 32, 33 in a harvesting machine 1 without collisions occurring between the individual processes. The individual processes can even supplement each other in a positive manner with the aid of process coordination unit 30.

For safety reasons, the system is designed such that the driver can manually override one or all of the machine parameters that were set, at any time during a harvesting operation. Finally, it is pointed out once more that the combine harvester shown in the figures, and the control and the specific method described in conjunction therewith are merely exemplary embodiments that could be modified in a variety of ways by one skilled in the art, without leaving the framework of the present invention. The method according to the present invention and/or a corresponding control unit can also be used, e.g., to set other working units in other types of combine harvesters, or on any other type of harvesting machine, e.g., a forage harvester.

It will be understood that each of the elements described above, or two or more together, may also find a useful application in other types of methods differing from the types described above.

While the invention has been illustrated and described as embodied in a method for controlling a harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for controlling a harvesting machine having plurality of adjustable working units, comprising the steps of:
    acting on the working units, the acting including at least one of optimizing, adjusting, and monitoring the working units in a plurality of separate control processes based on certain received control commands;
    using a process coordination unit to determine an operating mode of a first control process of a first working unit being one of the working units with consideration for a current operating mode of a second control process of an other working unit among the working units; and
    optimizing the first working unit after determining none of the other working units currently under an optimization process.

2. A method as defined in claim 1; and further comprising:
    initially transmitting a control command for adjusting the operating mode to the process coordination unit; and
    determining by the process coordination unit the operating mode based on the control command and with consideration for the current operating mode.

3. A method as defined in claim 1, wherein, when the current operating mode is changed, automatically switching the first control process to another operating mode by the process coordination unit.

4. A method as defined in claim 1; and further comprising transmitting a parameter value recorded in one of said first and second control processes to the process coordination unit, which releases the parameter value for use, as needed in the other of said first and second control processes.

5. A method as defined in claim 1; and further comprising including a cleaning optimization process in at least one of said control processes.

6. A method as defined in claim 1; and further comprising including a threshing mechanism optimization process in at least one of said control processes.

7. A method as defined in claim 1; and further comprising including a ground speed regulating process in at least one of said control processes.

8. A method as defined in claim 7; and further comprising regulating a speed in a cruise control operating mode as a function of a constant setpoint speed in the ground speed regulating process.

9. A method as defined in claim 7; and further comprising regulating a speed in a throughput-regulating operating mode as a function of a crop material throughput setpoint value in said ground speed regulating process.

10. A method as defined in claim 7; and further comprising regulating a speed in a loss-regulating operating mode as a function of a crop material loss setpoint value in said ground speed regulating process.

11. A method as defined in claim 7; and further comprising switching said ground speed regulating process to a throughput-regulating operating mode when at least one of said control processes selected from the group consisting of a cleaning optimization process and a threshing mechanism optimization process is switched on.

12. A control unit for controlling a harvesting machine having plurality of adjustable working units, comprising:
    an interface for recording control commands;
    a control signal interface for controlling the working units;
    a number of process-control units which apply control signals via said control signal interface to the working units based on recorded control commands in separate, defined control processes in order to perform an action selected from the group consisting of an adjustment, a monitoring, and both; and a process coordination unit connected with said process control units configured such that it determines an operating mode of a first control process of a first working unit being one of the working units with consideration for a current operating mode of a second control process of an other working unit among the working units and transmits relating operating mode specification signals to said process control units, the control unit optimizing the first working unit after determining none of the other working units currently under an optimization process.

13. A control unit as defined in claim 12, wherein said interface is connected with said process coordination unit such that the control commands received by said interface are transmitted to said process coordination unit.

14. A control unit as defined in claim 12, wherein said process coordination unit includes a process status input for receiving status information regarding the current operating mode.

15. A harvesting machine having plurality of adjustable working units, comprising:
    a control unit including an interface for recording control commands;
    a control signal interface for controlling the working units;
    a number of process-control units which apply control signals via said control signal interface to the working units based on recorded control commands in separate, defined control processes in order to perform an action selected from the group consisting of an adjustment, a monitoring, and both; and
    a process coordination unit connected with said process control units configured such that it determines an operating mode of a first control process of a first working unit being one of the working units with consideration for a current operating mode of a second control process of an other working unit among the working units and transmits relating operating mode specification signals to said process control units, the control unit optimizing the first working unit after determining none of the other working units currently under an optimization process.

16. A computer readable medium for use in a programmable control unit of a harvesting machine containing program code means for carrying out all steps in a method including the steps of acting on a plurality of working units of the harvesting machine selected from the group consisting of adjusting the working units, monitoring the working units and both in a plurality of separate control processes based on certain received control commands; using a process coordination unit to determine an operating mode of a first control process of a first working unit being one of the working units with consideration for a current operating mode of a second control process of an other working unit among the working units, when the program product is executed in said control unit; and optimizing the first working unit after determining none of the other working units currently under an optimization process.

* * * * *